F. LAPAIRE & F. X. JACQUOT.
Improvement in Portable-Furnace and Kettle.
No. 133,231.                          Patented Nov. 19, 1872.
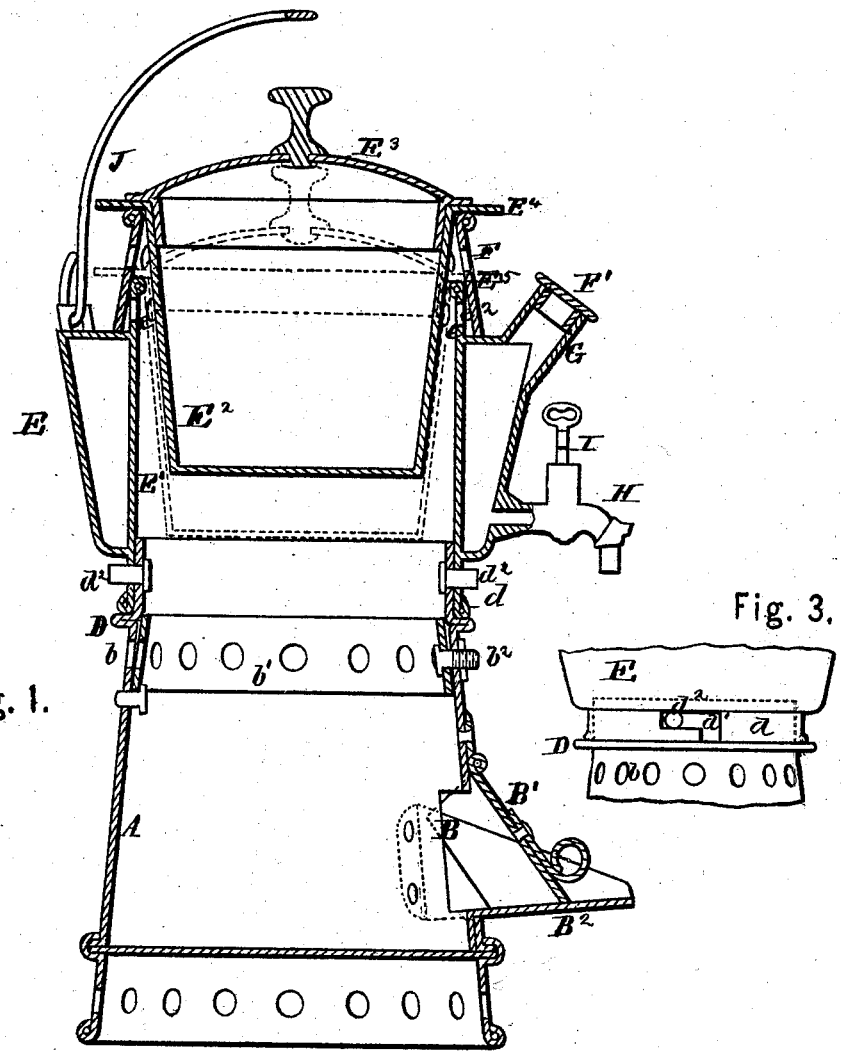

UNITED STATES PATENT OFFICE.

FRANCIS LAPAIRE AND FRANÇOIS X. JACQUOT, OF WILMINGTON, DEL.

IMPROVEMENT IN PORTABLE FURNACES AND KETTLES.

Specification forming part of Letters Patent No. 133,231, dated November 19, 1872.

*To all whom it may concern:*

Be it known that we, FRANCIS LAPAIRE, and FRANÇOIS X. JACQUOT, of Wilmington, in the county of New Castle and State of Delaware, have invented a new and valuable Improvement in Portable Kettle and Furnace; and we do hereby declare that the following is a full, clear, and exact description of the construction and operation of the same, reference being had to the annexed drawing making a part of this specification, and to the letters and figures of reference marked thereon.

Figure 1 of the drawing is a representation of a vertical section of our invention. Fig. 2 is a sectional detail view of our invention. Fig. 3 is a detail view of our invention.

This invention has relation to a portable heating and cooking apparatus; and it consists in the construction and novel arrangement of a stove or heater, a kettle or water-boiler, and a vessel for cooking food, all substantially as hereinafter more fully described.

Referring to the accompanying drawing illustrating our invention, A designates a small sheet-iron stove, which may be adapted to burn either wood or coal, and which is made tapering in form, so that it may have a base broad enough to support it and the kettle firmly. B indicates the fuel-opening; $B^1$, the door, hinged so as to work up and down; and $B^2$, the hearth, extending from the lower part of the fuel-opening, as shown, inclined toward said opening so as to convey the fuel into the stove, and provided with raised sides to prevent the fuel from falling on the ground. D designates a flange, encircling the upper part of the stove, and designed to support the kettle. Above said flange the stove is cylindrical. Below the flange the stove is perforated, as shown at $b$, to produce a draft. $b^1$ represents an annular perforated slide, secured within the stove, and operated by a stud or pin, $b^2$, passing through a slot. This slide is used for the purpose of regulating the draft. E represents the kettle, constructed of sheet metal, and of an annular form, the water-space being around the inner cylindrical wall $E^1$. This wall extends some distance below the water-space and forms a rim, $d$, which fits over the top of the stove and rests on the flange D. In the rim $d$ are cut L-shaped slots, $d^1$, which receive the studs $d^2$, projecting from the stove. When the kettle, after being placed on the stove, is turned around, the studs $d^2$ are received by the horizontal sections of said slots, and the kettle and stove thereby locked together. By turning the kettle back until the vertical sections of the slots coincide with the studs, the kettle may be lifted off. The wall $E^1$ extends, also, above the water-space, and constitutes a rim, $e$, to support a vessel, $E^2$, designed to contain meat or vegetables while they are being cooked, and provided with a lip, $e^1$, to rest on said rim. Around said rim draft-openings $e^2$ are made, as shown. The vessel $E^2$ is tapering in form, to allow the heat to pass up at its sides, and is sufficiently deep to bring its lower part in close proximity to the fire. $E^3$ designates the cover of said vessel, and $E^4$ ears by which to handle the vessel. $E^5$ represents a movable rim, which is designed to fit over the rim $e$, but which is higher than the latter, and made tapering, so that its upper end may be of the same diameter as the rim $e$. This movable rim is intended to support the cooking-vessel some distance above the fire, when the nature of the contents renders the higher arrangement preferable. The movable rim is perforated, as shown at F, for the purpose of providing a draft. G denotes a spout for conducting water or other fluid to the kettle. $F'$ is a cap to close said spout. H represents a lock-faucet, to be used in drawing off the contents of the kettle. I represents the removable key to said faucet. J designates a bail, by means of which the whole apparatus may be carried.

This apparatus is designed, principally, for the use of out-door workmen, and others whose occupations render the use of a portable cooking apparatus advantageous and convenient. The kettle or boiler may be used not only for heating water, but for heating coffee, tea, or other beverage.

What we claim as our invention, and desire to secure by Letters Patent, is—

1. The improved portable cooking apparatus, consisting of the stove A having the studs $d^2$, perforations $b$, and annular slide $b^1$, the annular kettle E having the slotted rim $d$ and the crown-rim $e$, and the cooking vessel $E^2$, all combined and arranged substantially as specified.

2. The annular kettle E having the flanges or rims $d$ $e$, bail J, spout G, and faucet H, substantially as specified.

3. The adjustable rim $E^5$, in combination with the annular kettle E, cooking vessel $E^2$, and stove A, substantially as specified.

In testimony that we claim the above we have hereunto subscribed our names in the presence of two witnesses.

FRANCIS LAPAIRE.
FRANÇOIS X. JACQUOT.

Witnesses:
JNO. HENRY PUHL,
SAMUEL C. PEIRCE.